United States Patent
Chen et al.

(10) Patent No.: US 12,487,645 B2
(45) Date of Patent: Dec. 2, 2025

(54) FIXING ASSEMBLY AND ELECTRONIC DEVICE

(71) Applicant: ASUSTek COMPUTER INC., Taipei (TW)

(72) Inventors: Chien-Ying Chen, Taipei (TW); Shih-Chuan Li, Taipei (TW)

(73) Assignee: ASUSTek COMPUTER INC., Taipei (TW)

( * ) Notice: Subject to any disclaimer, the term of this patent is extended or adjusted under 35 U.S.C. 154(b) by 122 days.

(21) Appl. No.: 18/636,205

(22) Filed: Apr. 15, 2024

(65) Prior Publication Data

US 2025/0271911 A1    Aug. 28, 2025

(30) Foreign Application Priority Data

Feb. 23, 2024    (TW) .................................. 113106536

(51) Int. Cl.
*G06F 1/18* (2006.01)
*G11B 33/04* (2006.01)

(52) U.S. Cl.
CPC .............. *G06F 1/183* (2013.01); *G11B 33/04* (2013.01)

(58) Field of Classification Search
CPC ..................................................... G06F 1/187
See application file for complete search history.

(56) References Cited

U.S. PATENT DOCUMENTS 9,652,001 B2 *    5/2017    Wang ....................... G06F 1/187
2011/0173805 A1 *    7/2011    Richet .................. G11B 33/123
                                                                    29/760

FOREIGN PATENT DOCUMENTS

CN    108255255    7/2018
TW    201824970    7/2018

* cited by examiner

*Primary Examiner* — Jerry Wu
(74) *Attorney, Agent, or Firm* — JCIPRNET

(57) ABSTRACT

A fixing assembly is adapted to fix a storage device. The storage device includes a first side surface, two opposite second side surfaces, a first hole located on the first side surface and two second holes located on the two second side surfaces. The fixing assembly includes a supporting body with a base plate and a side plate and two moving components disposed on two sides of the base plate. The side plate has a first positioning column. An accommodating space is formed between the supporting body and the two moving components. The two moving components includes two second positioning columns. The first positioning column and the two second positioning columns protrude towards the accommodating space. When the storage device is disposed in the accommodating space, the first positioning column inserts into the first hole, and the two second positioning columns are adapted to insert into the two second holes.

9 Claims, 13 Drawing Sheets

FIXING ASSEMBLY AND ELECTRONIC DEVICE

CROSS-REFERENCE TO RELATED APPLICATION

This application claims the priority benefit of Taiwan application serial no. 113106536, filed on Feb. 23, 2024. The entirety of the above-mentioned patent application is hereby incorporated by reference herein and made a part of this specification.

BACKGROUND

Technical Field

This disclosure relates to a fixing assembly and an electronic device, and in particular to a fixing assembly and an electronic device that may quickly fix a storage device.

Description of Related Art

Generally speaking, storage hard disks in servers or industrial computers are installed in servers or industrial computers by means of a fixed bracket to which the storage hard disks are screwed. However, such a design results in higher labor hours for assembly and material preparation, requires more equipment for the production process, and may cause problems such as screws falling out during the assembly process. In addition, when a storage hard drive needs to be serviced, removing and reattaching the screws can increase the time required for servicing. Therefore, how quickly storage hard disks can be fixed or removed from the fixed brackets is a topic of discussion in this field.

SUMMARY

The disclosure provides a fixing assembly and an electronic device, capable of quickly fixing a storage device.

The fixing assembly of the disclosure is adapted to fix a storage device. The storage device includes a first side surface, two second side surfaces opposite to each other and adjacent to the first side surface, a first hole located on the first side, and two second holes located on the two second side surfaces respectively. The fixing assembly includes a supporting body and two moving components. The supporting body includes a base plate and a side plate connected to each other. The base plate is adapted to carry the storage device. The side plate has a first positioning column extending in a first axial direction. The two moving components are movably disposed on two sides of the base plate in a second axial direction. An accommodating space is formed between the supporting body and the two moving components. The two moving components respectively include two second positioning columns extending in the second axial direction. The first positioning column and the two second positioning columns protrude towards the accommodating space. When the storage device is disposed in the accommodating space, the first positioning column is inserted into the first hole, and the two second positioning columns are adapted to be inserted into the two second holes.

An electronic device of the disclosure includes a storage device and a fixing assembly. The storage device includes a first side surface and two second side surfaces opposite to each other. The first side surface has a first hole. The two second side surfaces opposite to each other are adjacent to the first side surface respectively. Each of the second side surface has a second hole. The fixing assembly includes a supporting body and two moving components. The supporting body includes a base plate and a side plate connected to each other. The base plate is adapted to carry the storage device. The side plate has a first positioning column extending in a first axial direction. The two moving components are movably disposed on two sides of the base plate in a second axial direction. An accommodating space is formed between the supporting body and the two moving components. The two moving components respectively include two second positioning columns extending in the second axial direction. The first positioning column and the two second positioning columns protrude towards the accommodating space. When the storage device is disposed in the accommodating space, the first positioning column is inserted into the first hole, and the two second positioning columns are adapted to be inserted into the two second holes.

Based on the above, the fixing assembly of the electronic device in the disclosure includes the supporting body and the moving component. The supporting body includes the first positioning column, and the moving component includes the second positioning column. The storage device may be fixed in the fixing assembly by inserting the first positioning column and the second positioning column into the first hole and the second hole of the storage device respectively. Since the moving component of the disclosure may be moved relative to the supporting body, a user may quickly fix the storage device or quickly dismantle the storage device by moving the two moving components close to or far away from the supporting body, so that the second positioning column may be inserted into or removed from the second hole of the storage device, and this design may enhance the efficiency of the assembly or maintenance.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
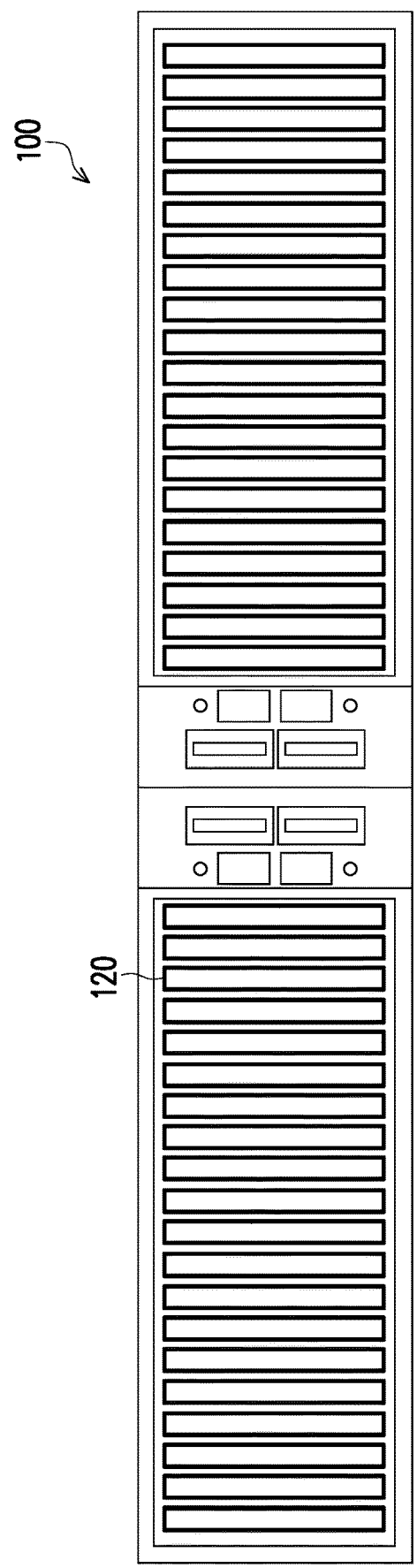
FIG. 1 is a schematic diagram of an electronic device according to an embodiment of the disclosure.
Figure 2:
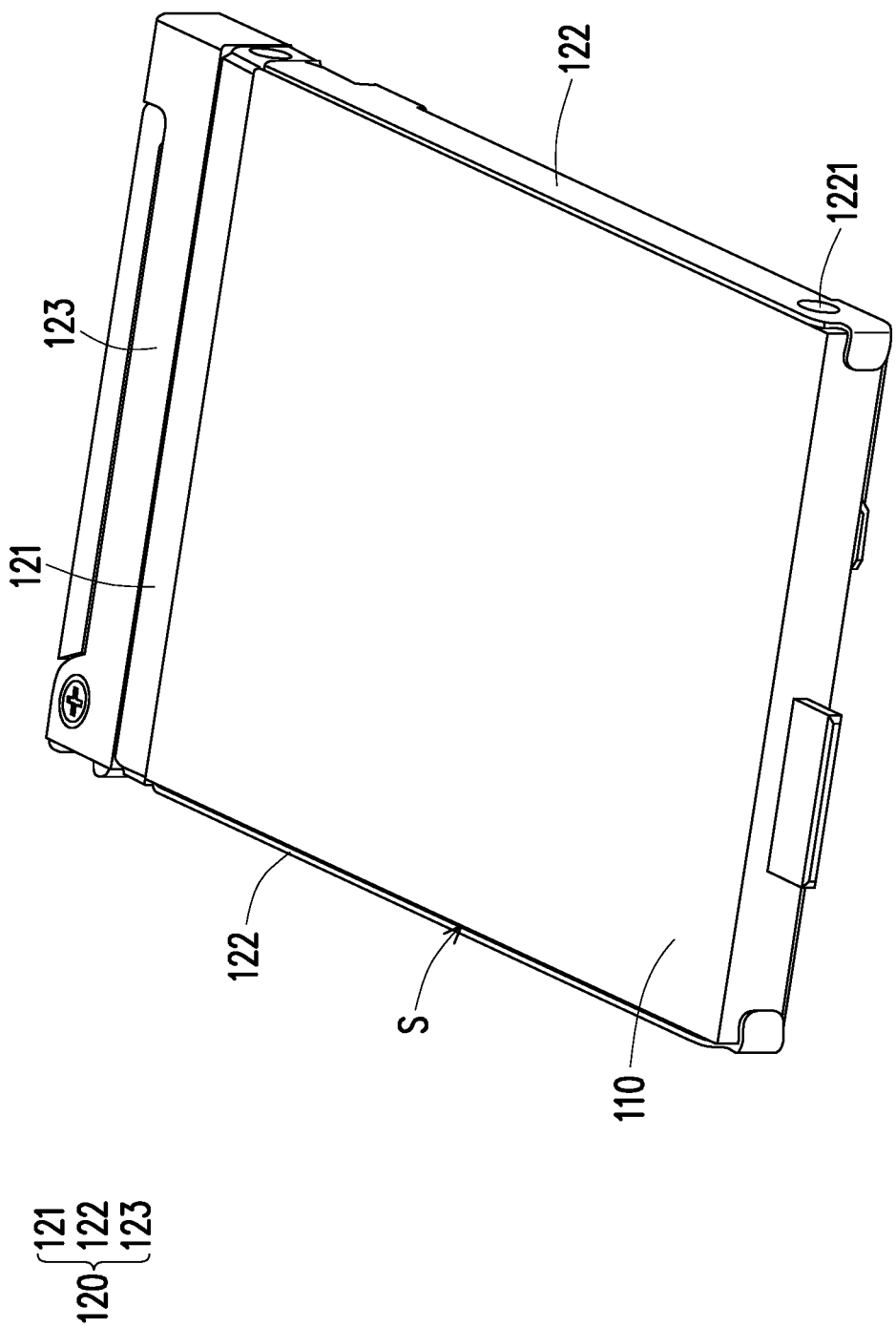
FIG. 2 is a schematic diagram of a storage device fixed to a fixing assembly of FIG. 1.

FIG. 1 is a schematic diagram of an electronic device according to an embodiment of the disclosure. FIG. 2 is a schematic diagram of a storage device fixed to a fixing assembly of FIG. 1. Referring to FIG. 1 and FIG. 2, an electronic device 100 in this embodiment is, for example, a server or an industrial computer. The electronic device 100 includes multiple storage devices 110 and multiple fixing assemblies 120. The storage device 110 is fixed to the fixing assembly 120 as shown in FIG. 2, and is disposed in the electronic device 100 through the fixing assembly 120.

Figure 3:
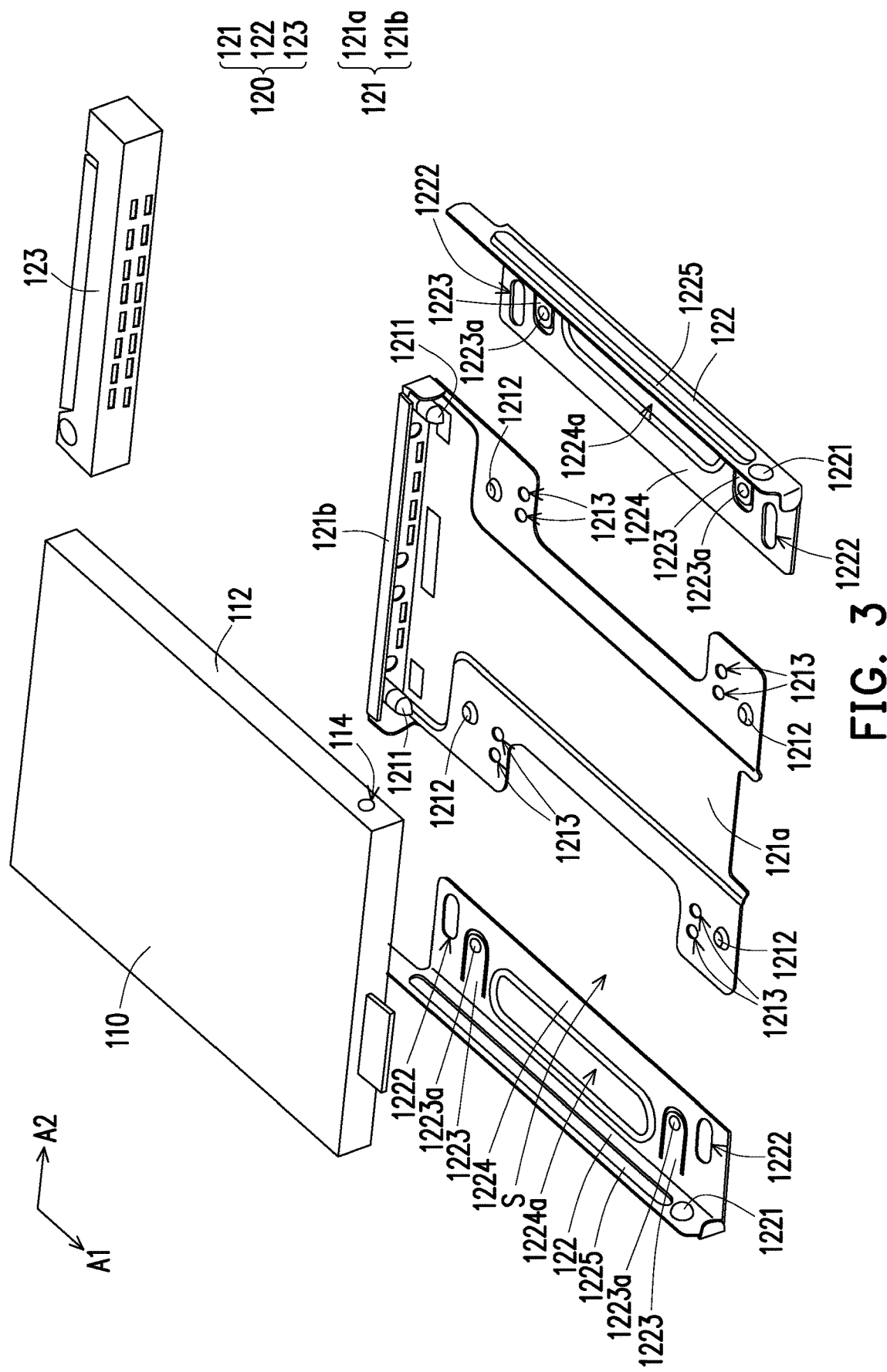
FIG. 3 is an exploded diagram of the storage device and the fixing assembly of FIG. 2.
Figure 4:
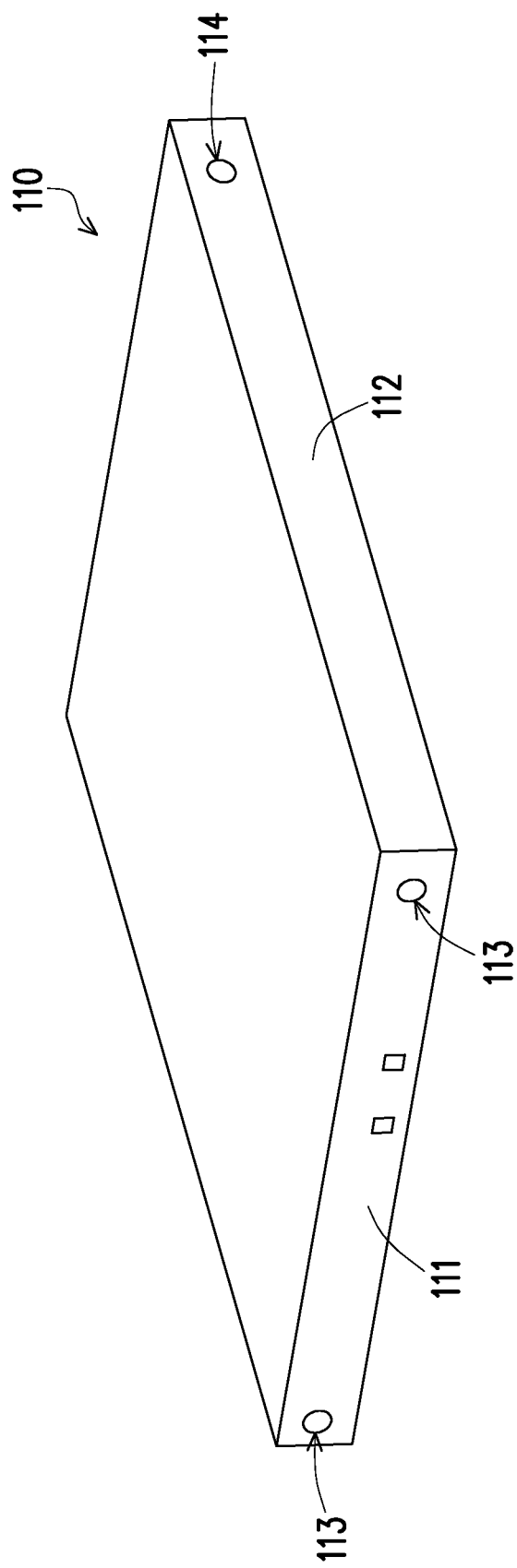
FIG. 4 is a schematic diagram of the storage device in FIG. 3 from another perspective.

FIG. 3 is an exploded diagram of the storage device and the fixing assembly of FIG. 2. FIG. 4 is a schematic diagram of the storage device in FIG. 3 from another perspective. Referring to FIG. 3 and FIG. 4, the storage device 110 includes a first side surface 111 (shown in FIG. 4), two second side surfaces 112 opposite to each other and adjacent to the first side surface 111, two first holes 113 located on the first side surface 111 (as shown in FIG. 4), and two second holes 114 respectively located on the two second side surfaces 112. The fixing assembly 120 includes a supporting body 121, two moving components 122, and an appearance component 123. The supporting body 121 includes a base plate 121a and a side plate 121b connected to each other. The base plate 121a is adapted to carry the storage device 110. The side plate 121b includes two first positioning columns 1211 extending in a first axial direction A1 and is connected to the appearance part 123. The two moving components 122 are movably disposed on two sides of the base plate 121a in a second axial direction A2. An accommodating space S is formed between the supporting body 121 and the two moving components 122, and the storage device 110 is located in the accommodating space S as shown in FIG. 2. The two moving components 122 respectively include two second positioning columns 1221 extending in the second axial direction A2. The first positioning column 1211 and the two second positioning columns 1221 protrude toward the accommodating space S as shown in FIG. 3.

As shown in FIG. 2, when the storage device 110 is disposed in the accommodating space S of the fixing assembly 120, the two first positioning columns 1211 are respectively inserted into the two first holes 113 of the storage device 110, and the two second positioning columns 1221 are respectively adapted to be inserted into the two second holes 114 of the storage device 110.

As mentioned above, the fixing assembly 120 of the electronic device 100 of this embodiment includes the supporting body 121 and the moving component 122. The supporting body 121 includes the first positioning column 1211, and the moving component 122 includes the second positioning column 1221. The storage device 110 may be fixed in the fixing assembly 120 by inserting the first positioning column 1211 and the second positioning column 1221 into the first hole 113 and the second hole 114 of the storage device 110 respectively. Since the moving component 122 of the disclosure may be moved relative to the supporting body 121, a user may quickly fix the storage device 110 or quickly dismantle the storage device 110 by moving the two moving components 122 close to or far away from the supporting body 110, so that the second positioning column 1221 may be inserted into or removed from the second hole 114 of the storage device 110, and this design may enhance the efficiency of the assembly or maintenance.

In this embodiment, the first axial direction A1 is perpendicular to the second axial direction A2, but the disclosure is not limited thereto.

In this embodiment, the storage device 110 is, for example, an E3.S solid state drive, but the type of the storage device 110 is not limited in the disclosure. In addition, in this embodiment, a number of the first hole 113, the second hole 114, the first positioning column 1211, and the second positioning column 1221 is two respectively, but the number of the first hole 113, the second hole 114, the first positioning column 1211, and the second positioning column 1221 is not limited thereto.

The following describes in detail the structure and combination of the supporting body 121 and the moving component 122.

Figure 5:
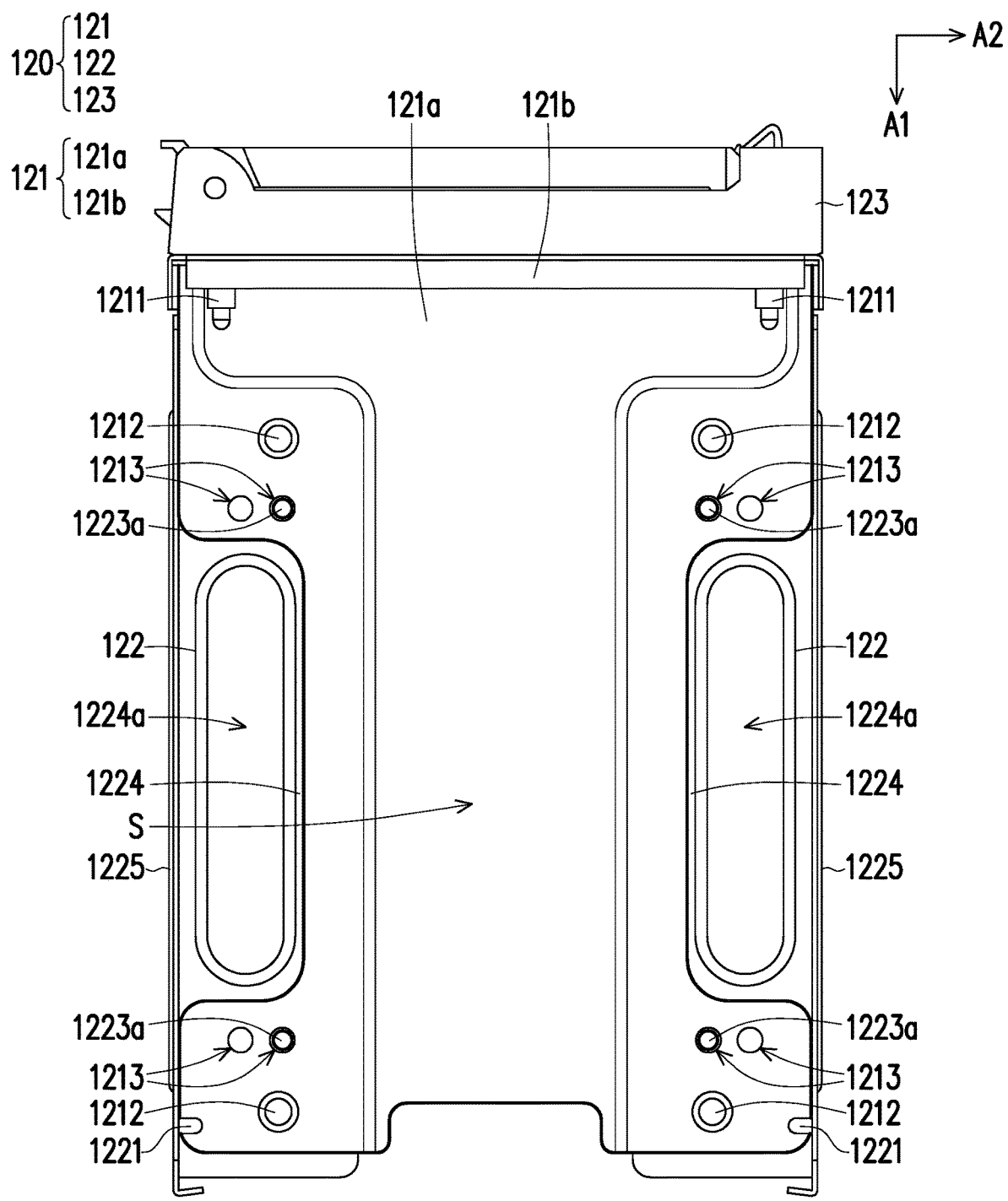
FIG. 5 is a schematic diagram of the fixing assembly of FIG. 2.

FIG. 5 is a schematic diagram of the fixing assembly of FIG. 2. Referring to FIG. 3 and FIG. 5. The two moving components 122 partially overlap the supporting body 121. The supporting body 121 includes a slider 1212. In this embodiment, the slider 1212 may be a rivet or a screw, but the disclosure is not limited thereto. Each of the moving components 122 includes a limiting chute 1222 extending in the second axial direction A2 (shown in FIG. 3). The slider 1212 is slidably disposed on the limiting chute 1222 to limit a moving distance of the moving component 122 relative to the supporting body 121 in the second axial direction A2. In this embodiment, the supporting body 121 is riveted to the moving component 122 through the slider 1212, for example, so that the supporting body 121 and the moving component 122 are not separated from each other in a direction perpendicular to a bottom wall 1224.

In this embodiment, a number of the slider 1212 and the limiting chute 1222 is four respectively. The limiting chutes 1222 are located at opposite ends of the moving component 122 in the first axial direction A1, and the sliders 1212 are located at four corners of the supporting body 121, but the disclosure does not limit the number and position of the limiting chute 1222 and the slider 1212. On the other hand, in other embodiments, the relationship between the each of the moving components, the supporting body, the slider, and the limiting chute may also be that the each of the moving components includes the slider and the supporting body includes the limiting chute, and the disclosure is not limited thereto.

Referring to FIG. 5, the each of the moving components 122 further includes a bottom wall 1224 and a side wall 1225 standing from the bottom wall 1224. The bottom wall 1224 includes a holding groove 1224a, and the side wall 1225 includes a second positioning column 1221. In this embodiment, when the user wants to move the each of the moving components 122 relative to the supporting body 121 in the second axial direction A2, the user may reach into the holding groove 1224a of the bottom wall 1224 with a finger to operate, so that the second positioning column 1221 may be inserted into or moved out of the second hole 114 of the storage device 110, i.e., the holding groove 1224a improves the ease of operation of the user.

Figure 6A:
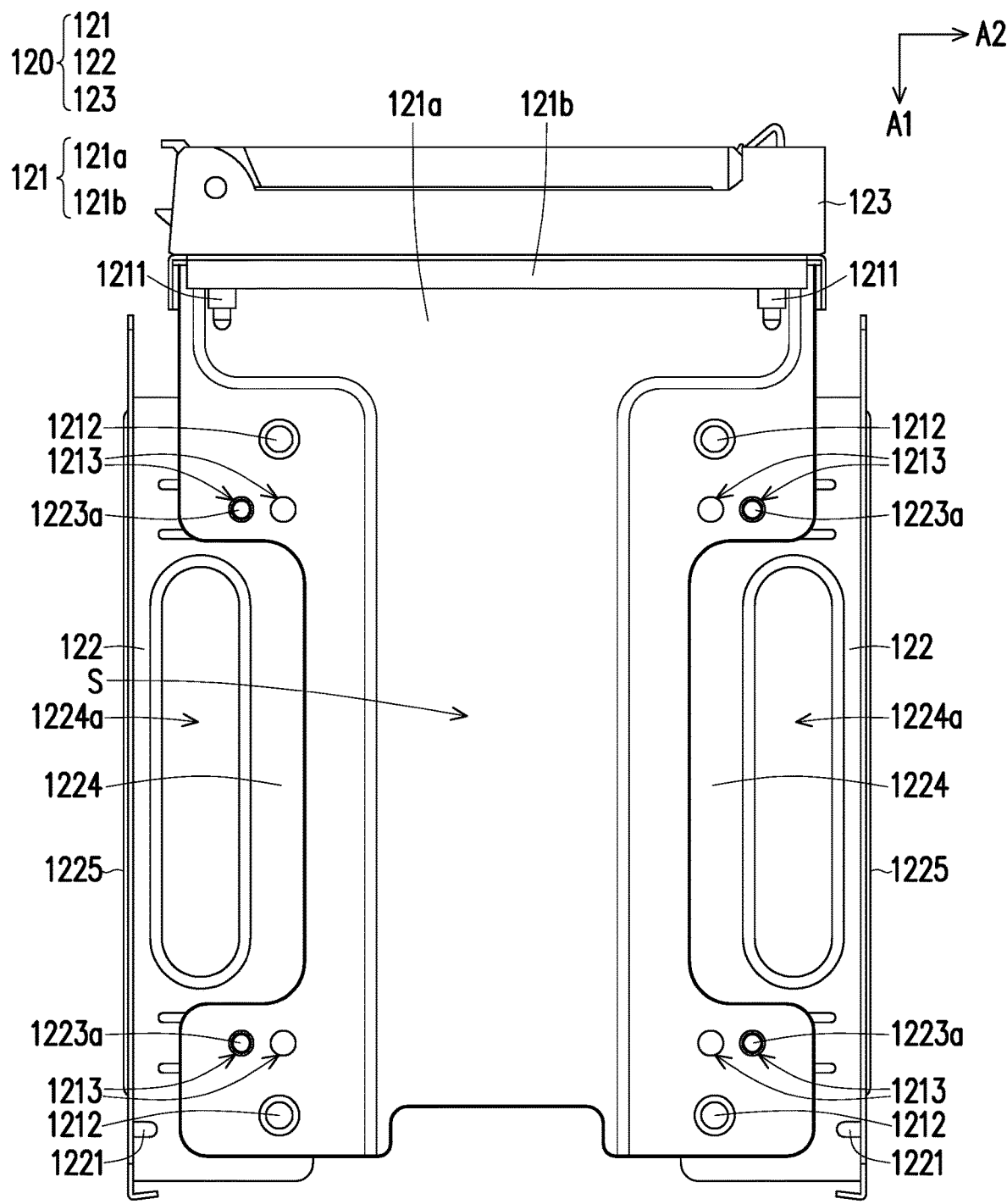
FIG. 6A shows a moving component of FIG. 5 being pulled outward.

FIG. 6A shows a moving component of FIG. 5 being pulled outward. Referring to FIG. 3, FIG. 5, and FIG. 6A, the each of the moving components 122 includes multiple elastic pieces 1223 (shown in FIG. 3), and the supporting body 121 includes multiple sets of two through holes 1213 arranged in the second axial direction A2. Each of the elastic pieces 1223 includes a convex hull 1223a, and the convex hull 1223a extends into one of the corresponding two through holes 1213. Specifically, in this embodiment, when the moving component 122 is in a fixed position relative to the supporting body 121 as shown in FIG. 5, the convex hull 1223a extends into an inner through hole 1213 of the two through holes 1213. When the moving component 122 is in a pulled-out position relative to the supporting body 121 as shown in FIG. 6A, the convex hull 1223a extends into an outer through hole 1213 of the two through holes 1213. However, the disclosure is not limited thereto. In other embodiments, when the moving component is in the fixed position relative to the supporting body, the convex hull may also extend into the outer hole of the two holes. When the moving component is in the pulled-out position relative to the supporting body, the convex hull may also extend into the inner hole of the two holes.

In this embodiment, when the convex hull 1223a extends into the through hole 1213, the elastic piece 1223 generates a sense of positioning feedback with the supporting body 121, so that the user may confirm that the convex hull 1223a has indeed extended into the through hole 1213 through the sound and the sense of positioning feedback. In addition, in this embodiment, the fixing assembly 120 further supports the supporting body 121 by means of the elastic piece 1223 to ensure that the convex hull 1223a does not come loose from the through hole 1213.

In this embodiment, a number of the elastic piece 1223 of the each of the moving components 122 is two, and a number of sets of the two through holes 1213 is four. However, the disclosure does not limit the number of the elastic piece 1223 and the number of sets of the two through holes 1213.

The following specifies the steps for fixing the storage device 110 to the fixing assembly 120.

Figure 6B:
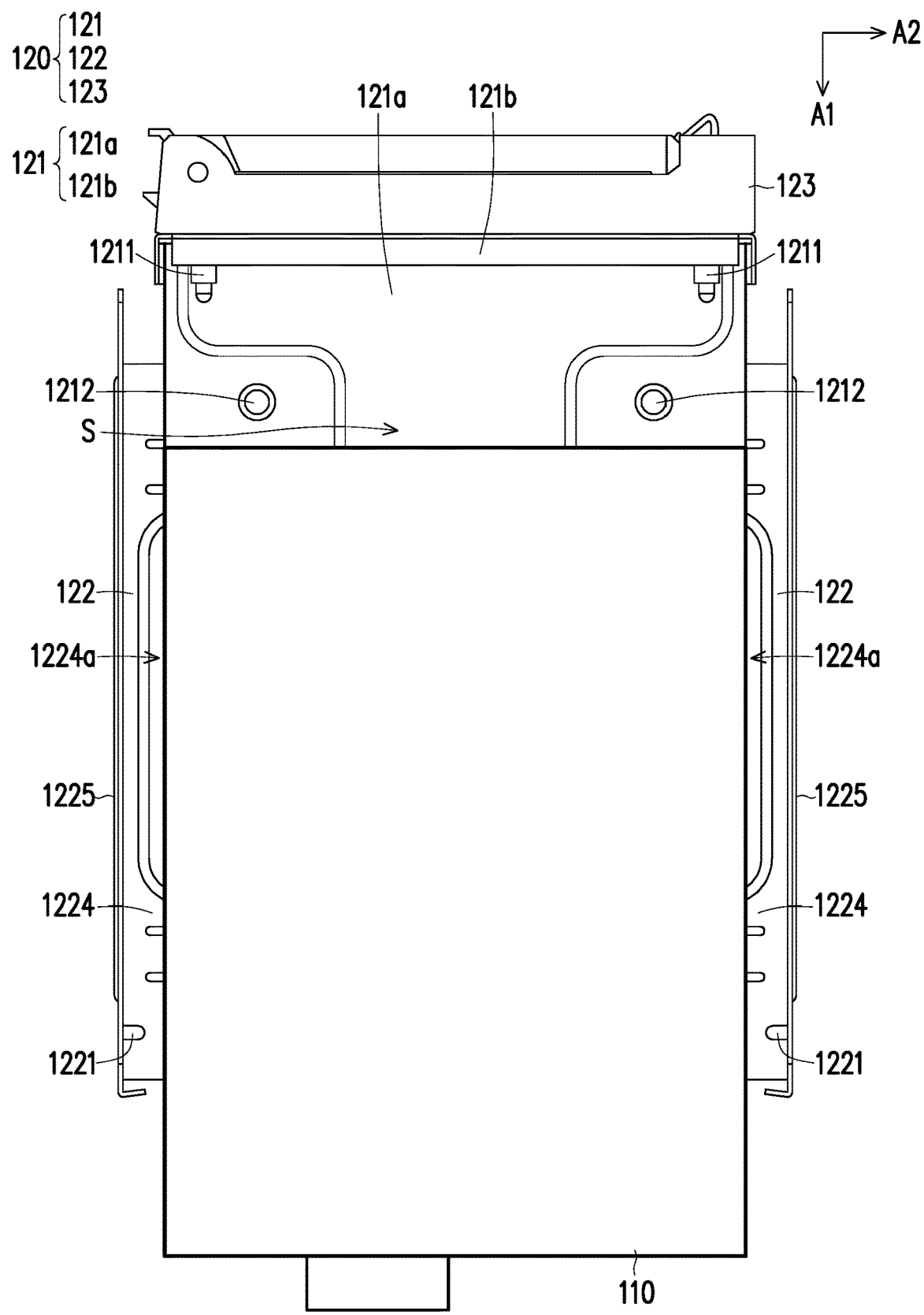
FIG. 6B shows a storage device disposed in a fixing assembly of FIG. 6A.
Figure 6C:
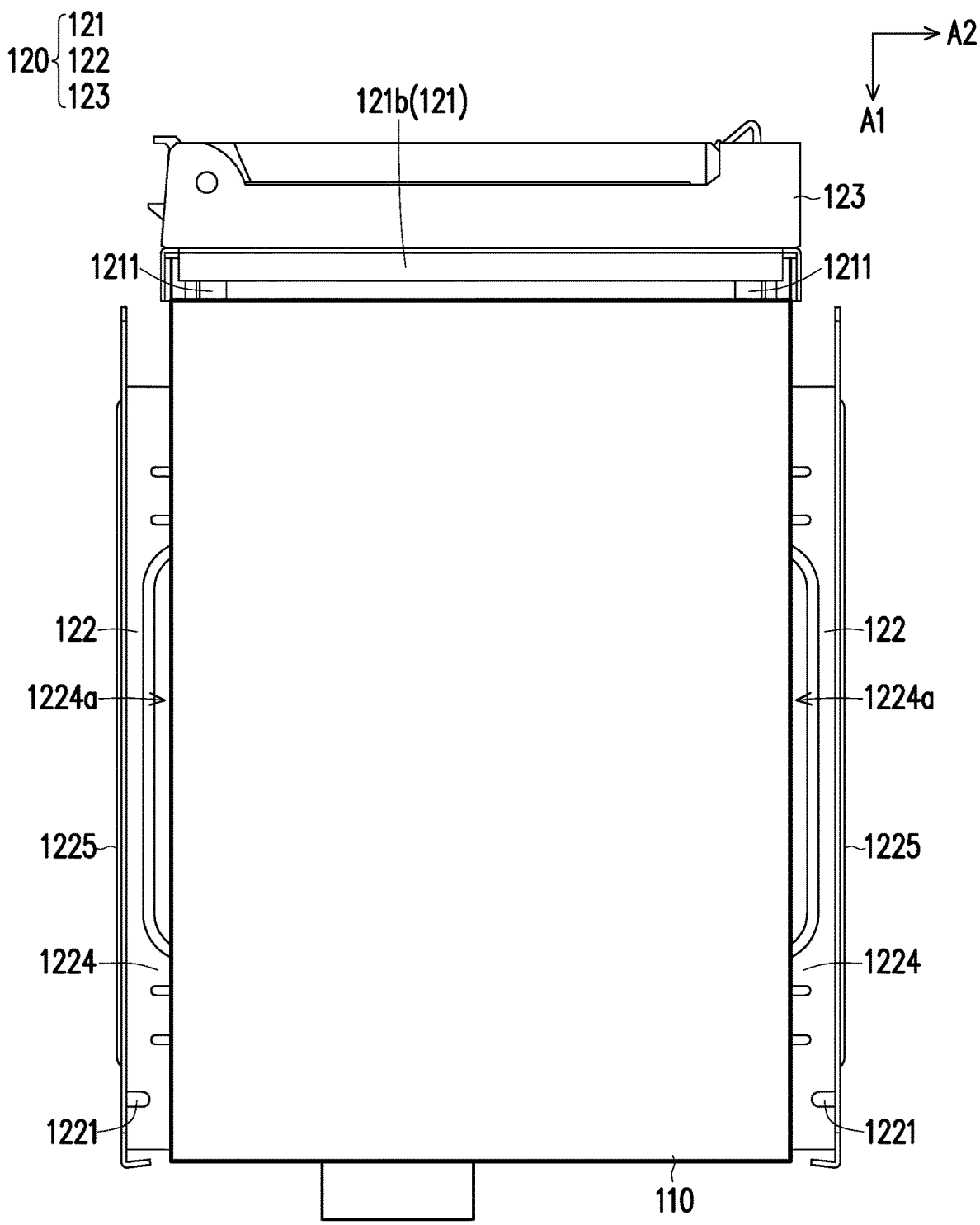
FIG. 6C shows the storage device of FIG. 6B moving in a first axial direction.
Figure 6D:
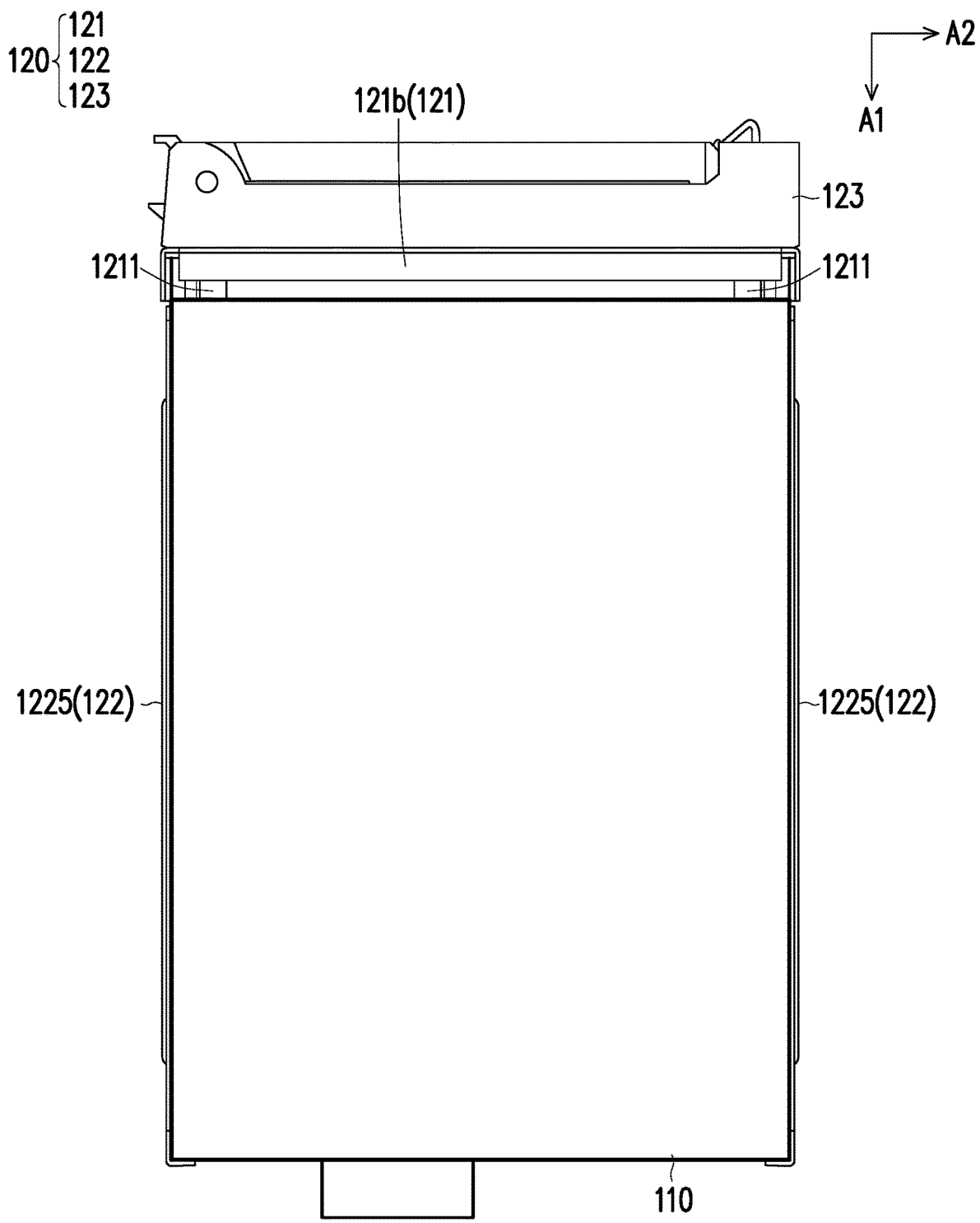
FIG. 6D shows a moving component of FIG. 6C moving in a second axial direction.

FIG. 6B shows a storage device disposed in a fixing assembly of FIG. 6A. FIG. 6C shows the storage device of FIG. 6B moving in a first axial direction. FIG. 6D shows a moving component of FIG. 6C moving in a second axial direction. Referring to FIG. 6A to FIG. 6D, first, as shown in FIG. 6A, the each of the moving components 122 is pulled away from the supporting body 121 in the second axial direction A2, so that the two moving components 122 are away from each other, and the convex hull 1223a extends from the inner through hole 1213 into the outer through hole 1213 of the two through holes 1213. Next, as shown in FIG. 6B, the storage device 110 is placed on the supporting body 121, and the storage device 110 is moved closer to the appearance component 123 in the first axial direction A1, so that the first positioning column 1211 is inserted into the first hole 113 of the storage device 113 as shown in FIG. 6C. Finally, the two moving components 122 are moved in the second axial direction A2 toward the supporting body 121, so that the two moving components 122 are close to each other, and the convex hull 1223a extends from the outer through hole 1213 into the inner through hole 1213 of the two through holes 1213. When the second positioning column 1221 is inserted into the second hole 114 of the storage device 110 as shown in FIG. 6D, the steps of fixing the storage device 110 to the fixing assembly 120 are completed.

Figure 7:
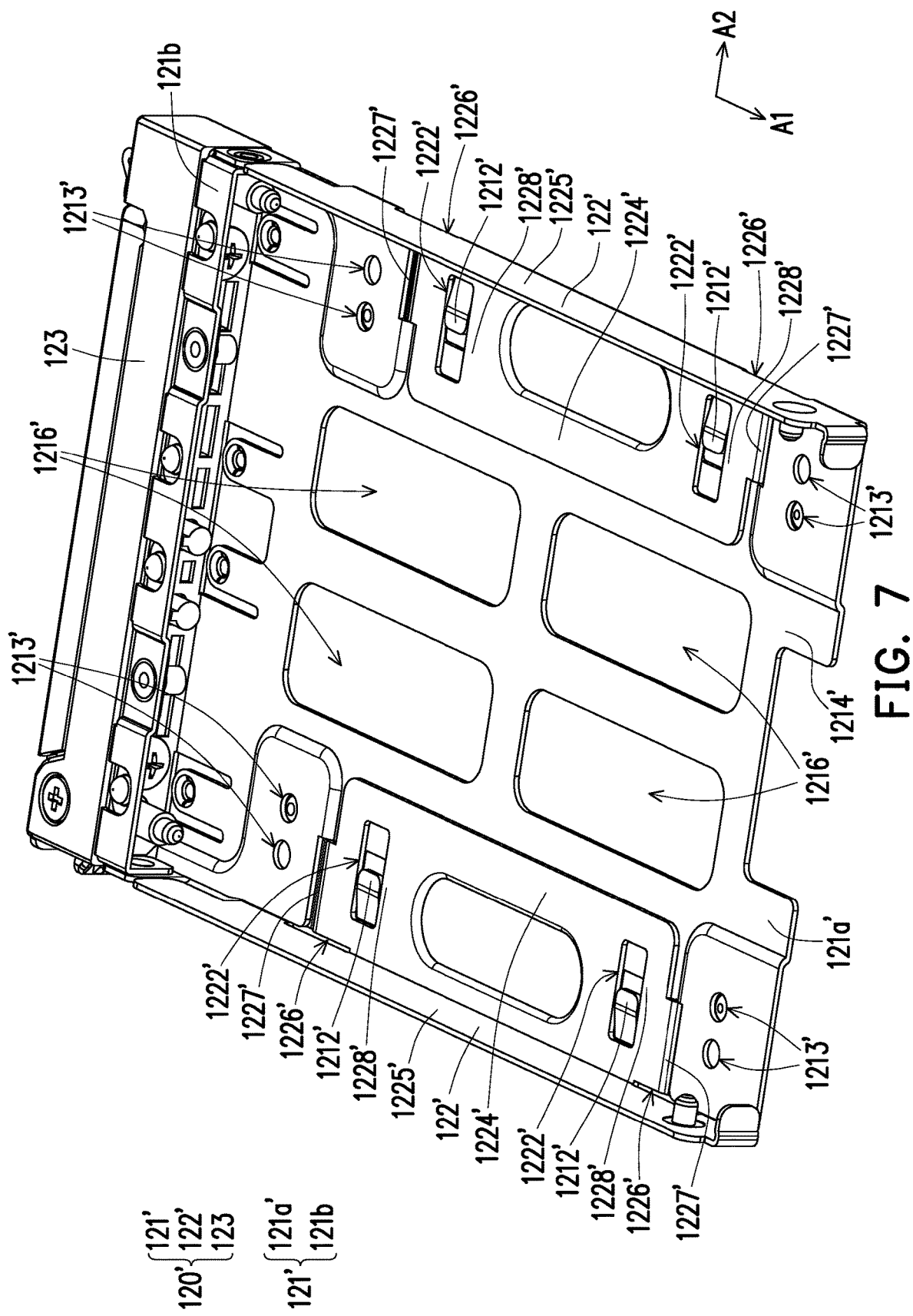
FIG. 7 is a schematic diagram of a fixing assembly according to another embodiment of the disclosure.
Figure 8:
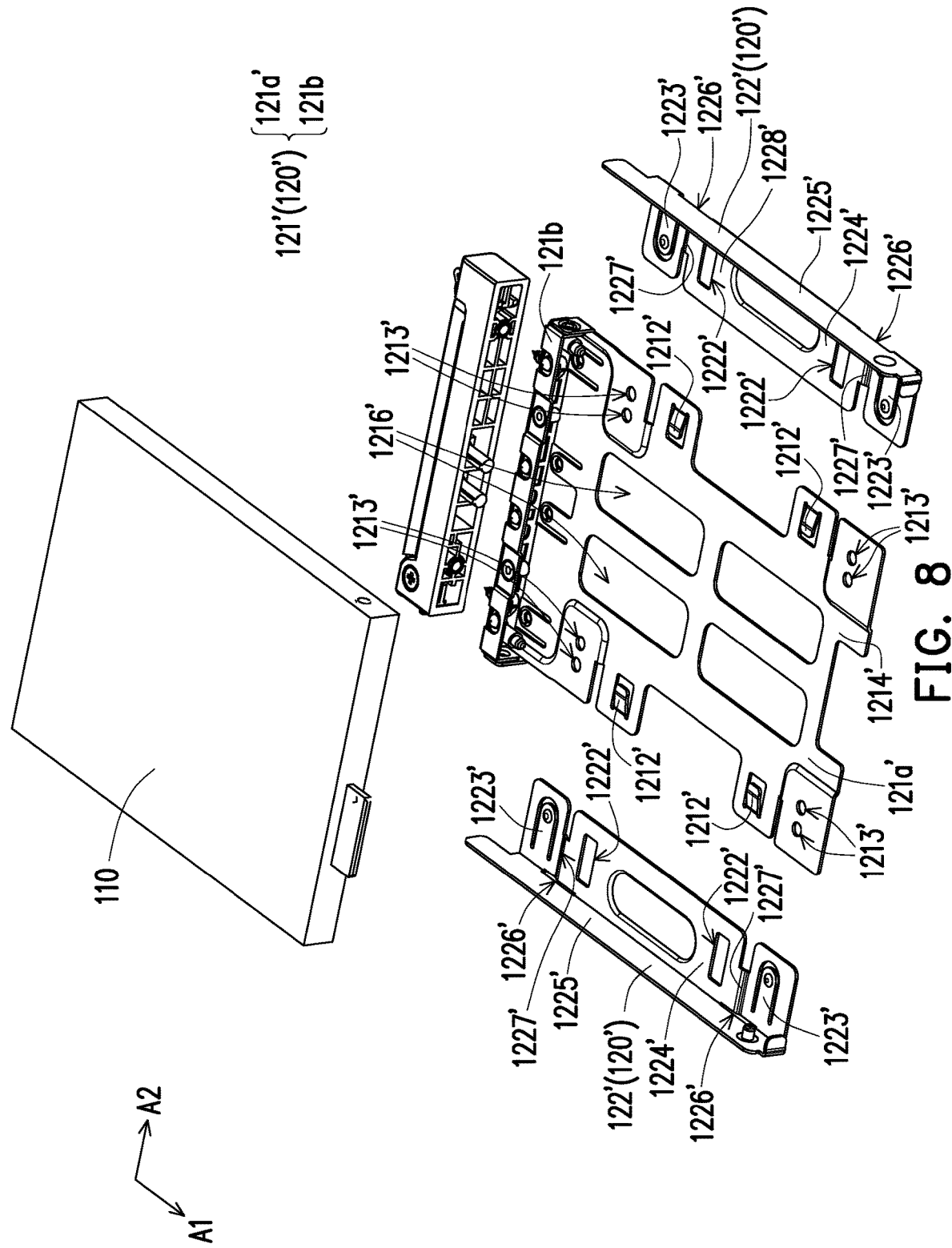
FIG. 8 is an exploded diagram of a storage device and the fixing assembly of FIG. 7.

FIG. 7 is a schematic diagram of a fixing assembly according to another embodiment of the disclosure. FIG. 8 is an exploded diagram of a storage device and the fixing assembly of FIG. 7. Referring to FIG. 3, FIG. 7, and FIG. 8, the difference between a fixing assembly 120' of this embodiment and the fixing assembly 120 of FIG. 3 is that a slider 1212' of this embodiment is formed by folding a supporting body 121'. In addition, a moving component 122' further includes a hollow area 1226' and the supporting body 121' further includes a heat dissipation hole 1216'. The following is an explanation of the differences only.

Compared with FIG. 3 where the slider 1212 of the fixing assembly 120 is a rivet riveted to the supporting body 121, in this embodiment, the slider 1212' of the fixing assembly 120' is formed by folding the supporting body 121', and is integrated with the supporting body 121'. Accordingly, the assembly process and assembly time of the fixing assembly 120' may be reduced, which in turn reduces the cost.

In other embodiments, the slider may also be formed by folding the moving component and is integrated with the moving component, and the supporting body includes a limiting chute, and the disclosure is not limited thereto.

The following describes in detail the structure and combination of the supporting body 121' and the moving component 122'.

Figure 9:
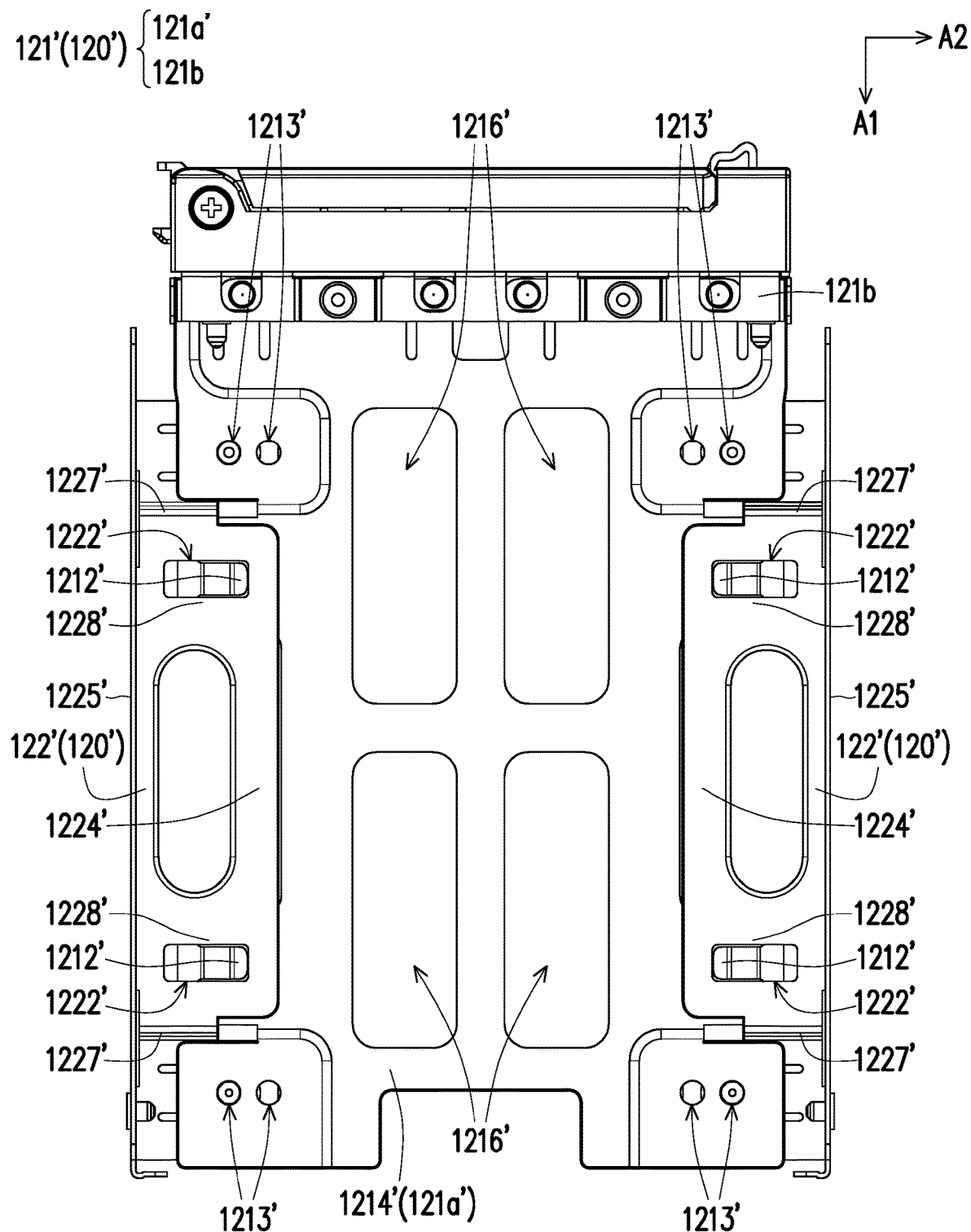
FIG. 9 shows two moving components of FIG. 7 being pulled outward.
Figure 10:
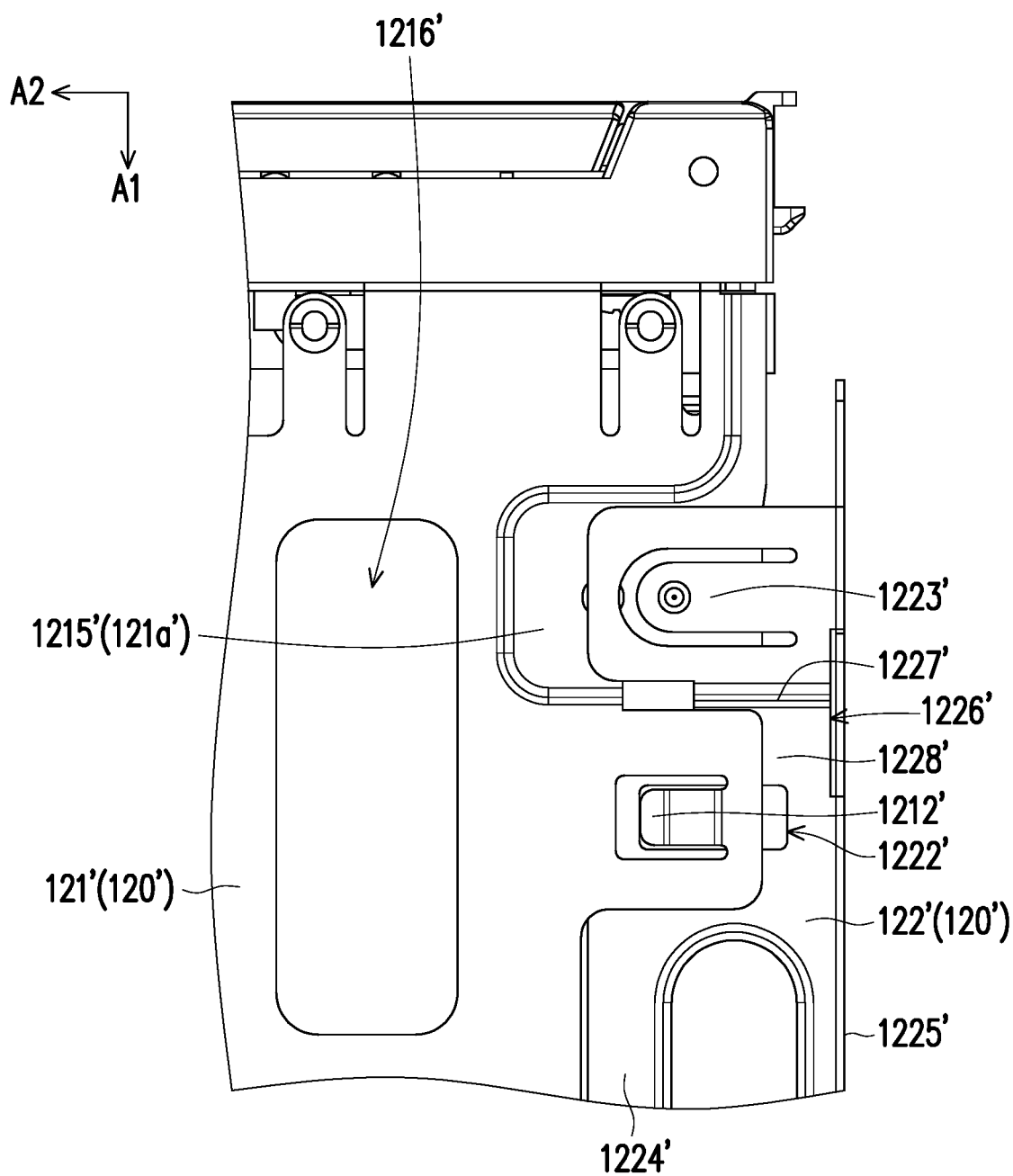
FIG. 10 is a partially enlarged diagram of the moving component and a supporting body of FIG. 9 from another perspective.

FIG. 9 shows two moving components of FIG. 7 being pulled outward. FIG. 10 is a partially enlarged diagram of the moving component and a supporting body of FIG. 9 from another perspective. Referring to FIG. 8 to FIG. 10, a base plate 121a' of the supporting body 121' includes a first surface 1214' and a second surface 1215' opposite to each other (shown in FIG. 10). Each moving components 122' includes two elastic pieces 1223' and two limiting chutes 1222'. The base plate 121a' of the supporting body 121' includes four sets of two through holes 1213' and four sliders 1212'. As shown in FIG. 10, the elastic piece 1223' is located next to the second surface 1215' and abuts against the second surface 1215'. The moving component 122' rests on the first surface 1214' at a part 1228' enclosing the limiting chute 1222' as shown in FIG. 9. Specifically, the each moving component 122' has a bend 1227' between the elastic piece 1223' and the limiting chute 1222', so that the elastic piece 1223' is in a different plane from the part 1228' of the moving component 122' enclosing the limiting chute 1222'.

In this embodiment, the fixing assembly 120' respectively abuts the second surface 1215' and the first surface 1214' through the elastic piece 1223' and the part 1228' of the moving component 122' enclosing the limiting chute 1222', so that the supporting body 121' and the moving component 122' are not separated from each other in a direction perpendicular to the first surface 1214'.

Referring to FIG. 7, Each moving component 122' includes a bottom wall 1224' and a side wall 1225' standing from the bottom wall 1224'. Multiple hollow areas 1226' are located next to the bend 1227' and located at a junction of the bottom wall 1224' and the side wall 1225', so that the moving component 122' can be bent between the elastic piece 1223' and the limiting chute 1222'.

In this embodiment, each moving component 122' includes two hollow areas 1226', but a number of the hollow area 1226' is not limited thereto.

Referring to FIG. 7, the base plate 121a' of the supporting body 121' of this embodiment further includes multiple heat dissipation holes 1216', so that the storage device 110 has a good heat dissipation effect. In this embodiment, a number of the heat dissipation hole 1216' is four, but the number of the heat dissipation hole 1216' is not limited thereto.

To sum up, the fixing assembly of the electronic device in the disclosure includes the supporting body and the moving component. The supporting body includes the first positioning column, and the moving component includes the second positioning column. The storage device may be fixed in the fixing assembly by inserting the first positioning column and the second positioning column into the first hole and the second hole of the storage device respectively. Since the moving component of the disclosure may be moved relative to the supporting body, a user may quickly fix the storage device or quickly dismantle the storage device by moving the two moving components close to or far away from the supporting body, so that the second positioning column may be inserted into or removed from the second hole of the storage device, and this design may enhance the efficiency of the assembly or maintenance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fixing assembly, adapted to fix a storage device, the storage device comprising a first side surface, two second side surfaces opposite to each other and adjacent to the first side surface, a first hole located on the first side surface, and two second holes located on the two second side surfaces respectively, wherein the fixing assembly comprising: a supporting body, comprising a base plate and a side plate connected to each other, wherein the base plate is adapted to carry the storage device, and the side plate has a first positioning column extending in a first axial direction; and two moving components, movably disposed on two sides of the base plate in a second axial direction, wherein an accommodating space is formed between the supporting body and the two moving components, the two moving components respectively comprise two second positioning columns extending in the second axial direction, and the first positioning column and the two second positioning columns protrude towards the accommodating space; when the storage device is disposed in the accommodating space, the first positioning column inserted into the first hole, and the two second positioning columns adapted to be inserted into the two second holes; and one of each of the moving components and the supporting body comprises an elastic piece, and the other one comprises two through holes arranged in the second axial direction, the elastic piece comprises a convex hull, when the moving component is in a fixed position relative to the supporting body, the convex hull extends into one of the two through holes, when the moving component is in a pulled-out position relative to the supporting body, the convex hull extends into the other one of the two through holes; and the base plate comprises a first surface and a second surface opposite to each other, the moving component comprises the elastic piece and a limiting chute, the base plate comprises the two through holes and a slider, the elastic piece is located next to the second surface and abuts against the second surface, and the moving component rests on the first surface at a part enclosing the limiting chute.

2. The fixing assembly according to claim 1, wherein the first axial direction is perpendicular to the second axial direction.

3. The fixing assembly according to claim 1, wherein the two moving components partially overlap the supporting body, one of each of the moving components and the supporting body comprises a limiting chute extending in the second axial direction, and the other one comprises a slider, the slider slidably disposed on the limiting chute.

4. The fixing assembly according to claim 3, wherein the slider is a rivet or a screw disposed on the corresponding moving component or supporting body.

5. The fixing assembly according to claim 3, wherein the slider is formed by folding the disposed moving component or supporting body, and is integrated with the disposed moving component or supporting body.

6. The fixing assembly according to claim 1, wherein the each of the moving components has a bend between the elastic piece and the limiting chute, such that the elastic piece is in a different plane from the part of the moving component enclosing the limiting chute, the each of the moving components comprises a bottom wall and a side wall standing from the bottom wall, and a hollow area is located next to the bend and located at a junction of the bottom wall and the side wall.

7. The fixing assembly according to claim 1, wherein each of the moving components comprises a bottom wall and a side wall standing from the bottom wall, the bottom wall comprises a holding groove, and the side wall comprises the second positioning column.

8. The fixing assembly according to claim 1, wherein the base plate comprises a heat dissipation hole.

9. An electronic device, comprising: a storage device, comprising: a first side surface, having a first hole; and two second side surfaces opposite to each other, respectively adjacent to the first side surface, and each of the second side surfaces has a second hole; and a fixing assembly, comprising: a supporting body, comprising a base plate and a side plate connected to each other, wherein the base plate is adapted to carry the storage device, and the side plate has a first positioning column extending in a first axial direction; and two moving components, movably disposed on two sides of the base plate in a second axial direction, wherein an accommodating space is formed between the supporting body and the two moving components, the two moving components respectively comprise two second positioning columns extending in the second axial direction, and the first positioning column and the two second positioning columns protrude towards the accommodating space; when the storage device is disposed in the accommodating space, the first positioning column inserted into the first hole, and the two second positioning columns adapted to be inserted into the two second holes; and one of each of the moving components and the supporting body comprises an elastic piece, and the other one comprises two through holes arranged in the second axial direction, the elastic piece comprises a convex hull, when the moving component is in a fixed position relative to the supporting body, the convex hull extends into one of the two through holes, when the moving component is in a pulled-out position relative to the supporting body, the convex hull extends into the other one of the two through holes; and the base plate comprises a first surface and a second surface opposite to each other, the moving component comprises the elastic piece and a limiting chute, the base plate comprises the two through holes and a slider, the elastic piece is located next to the second surface and abuts against the second surface, and the moving component rests on the first surface at a part enclosing the limiting chute.

* * * * *